(12) United States Patent
Ueno (10) Patent No.: US 8,023,049 B2
(45) Date of Patent: Sep. 20, 2011

(54) THIN-SHAPED TELEVISION

(75) Inventor: Satoshi Ueno, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1183 days.

(21) Appl. No.: 11/790,117

(22) Filed: Apr. 24, 2007

(65) Prior Publication Data

US 2008/0117342 A1 May 22, 2008

(30) Foreign Application Priority Data

Apr. 26, 2006 (JP) ................................ 2006-122264

(51) Int. Cl.
*H04N 5/64* (2006.01)

(52) U.S. Cl. ........ 348/836; 348/843; 348/844; 348/838; 348/839

(58) Field of Classification Search .......... 348/836–842; 248/550

See application file for complete search history.

(56) References Cited

U.S. PATENT DOCUMENTS

| | | | | |
|---|---|---|---|---|
| 5,038,835 A * | 8/1991 | Breyer | ...................... | 139/1 R |
| 5,274,301 A * | 12/1993 | Takahashi et al. | ............. | 313/406 |
| 5,376,863 A * | 12/1994 | Kim et al. | ..................... | 313/404 |
| 5,557,162 A * | 9/1996 | Han | .............................. | 313/402 |
| 5,595,417 A * | 1/1997 | Thoman et al. | .......... | 296/100.09 |
| 5,822,813 A * | 10/1998 | Powell | .............................. | 5/118 |
| 6,013,975 A * | 1/2000 | Gijrath | .......................... | 313/407 |
| 6,046,535 A * | 4/2000 | Jung | .............................. | 313/402 |
| 6,748,716 B1 * | 6/2004 | Peck et al. | ................. | 52/718.04 |
| 7,543,792 B1 * | 6/2009 | Ursel et al. | ..................... | 248/638 |
| 2003/0168574 A1 * | 9/2003 | Watanabe et al. | ............. | 248/638 |

FOREIGN PATENT DOCUMENTS

| | | |
|---|---|---|
| JP | 02-165785 | 6/1990 |
| JP | 2004-258055 | 9/2004 |
| JP | 2004-304679 | 10/2004 |
| JP | 2005-101907 | 4/2005 |
| JP | 2006-005795 | 1/2006 |

* cited by examiner

*Primary Examiner* — Eileen D Lillis
*Assistant Examiner* — Alp Akbasli
(74) *Attorney, Agent, or Firm* — Bacon & Thomas, PLLC (57) ABSTRACT

Interference between a television main body and an obstacle can be suppressed when the main body is turned in horizontal directions, and damage of the television main body and the obstacle can be prevented.

Operating bars are provided for corner portions on both sides of the television main body in a longitudinal direction, bosses having a collar portion on the inside thereof are formed from the operating bar toward hole portion formed in the corner portions on both sides of the television main body in a protruded manner, a plate-shaped portion bridging the corner portions is provided on the back side of the hole portion of the television main body, a spring that energizes the boss toward the outside is arranged between the plate-shaped portion and the collar portion of the boss, a sensor is provided for at least one area in the vertical directions of the operating bar, in which the sensor is constituted by contact terminals provided on both sides of the boss of the operating bar, contact terminals provided on the pore wall of the hole portions of the television main body so as to face the contact terminals, a contact terminal provided at the tip of the boss, and a contact terminal provided for the plate-shaped portion so as to face the contact terminal.

1 Claim, 9 Drawing Sheets

THIN-SHAPED TELEVISION

BACKGROUND OF THE INVENTION

1. Technical Field

The present invention relates to a thin-shaped television that is freely turnably supported on a fixed base in horizontal directions by the drive of a motor and is provided with a television main body having a display section on a front face.

2. Background Art

Figure 4A:
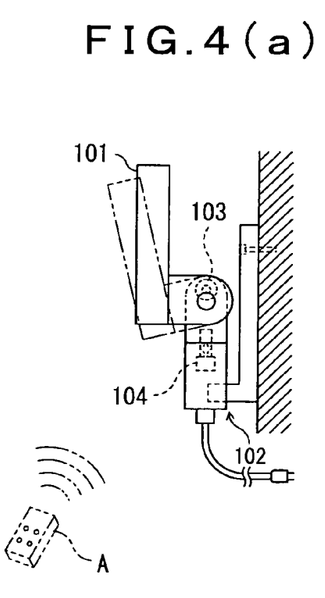
FIG. 4A is a side view thereof.
Figure 4B:
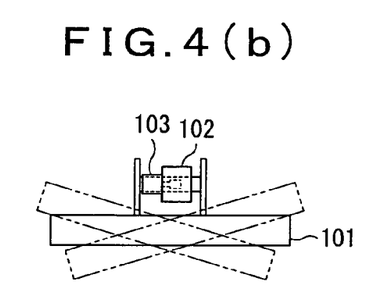
FIG. 4B is a top view thereof.
Figure 4C:
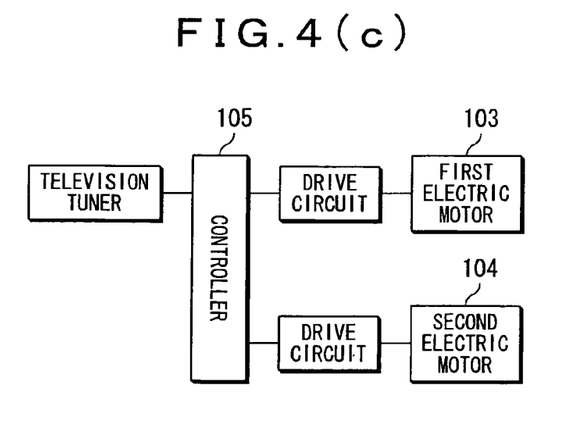
FIG. 4C is a block diagram thereof.

The first prior art is shown in FIGS. 4A, 4B and 4C. As shown in FIGS. 4A, 4B and 4C, the conventional television set has a constitution where a display section 101 turnably installed on a supporting body 102 is made turnable in vertical and horizontal directions with respect to the supporting body 102, and is equipped with: a first electric motor 103 that turns the display section 101 in vertical directions; a second electric motor 104 that turns the display section 101 in horizontal directions; and a controller 105 that receives angle adjusting signals transmitted from a remote controller A of the display section to perform drive/stop control to the electric motors 103 and 104, in which the rotating angle of the display section 101 is made adjustable in each of vertical and horizontal directions by the manual operation of the remote controller A (refer to Japanese Patent Laid-Open No. 2006-5795, for example).

However, in this constitution, there has been a problem of possibility that the display section 101 was damaged when the display section 101 touched obstacle in the case where the first electric motor 103 was driven and the display section 101 turned in horizontal directions. Furthermore, a sensor for detecting it has not been provided when the section touched the obstacle.

Figure 5A:
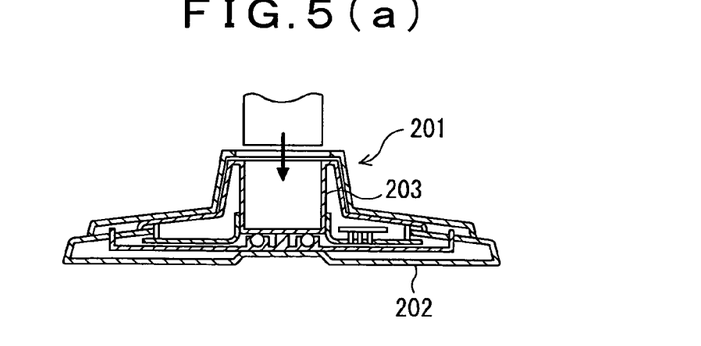
FIG. 5A is a partial sectional view thereof.
Figure 5B:
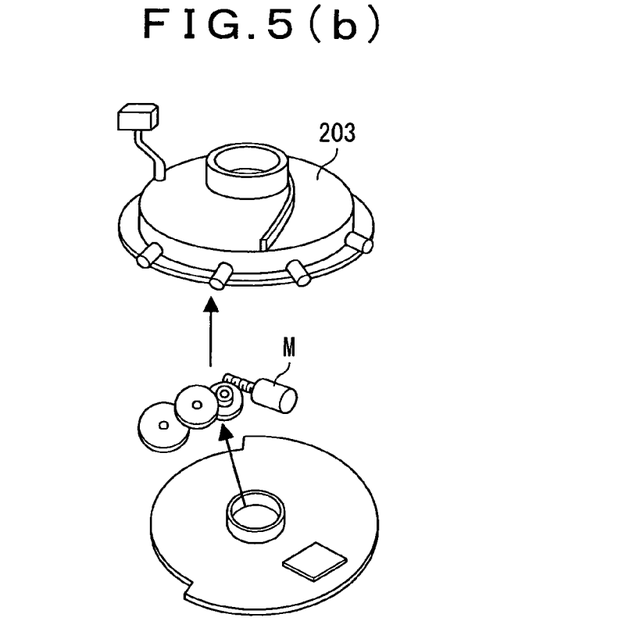
FIG. 5B is a partial exploded perspective view thereof.
Figure 5C:
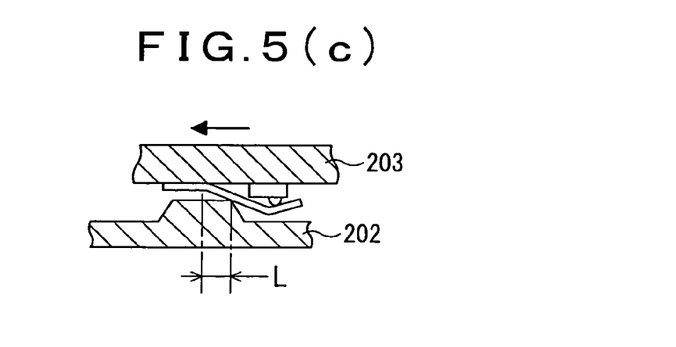
FIG. 5C is a side surface sectional view showing a state where a switch is pushed down by a protrusion in rotating the rotating piece.
Figure 6:
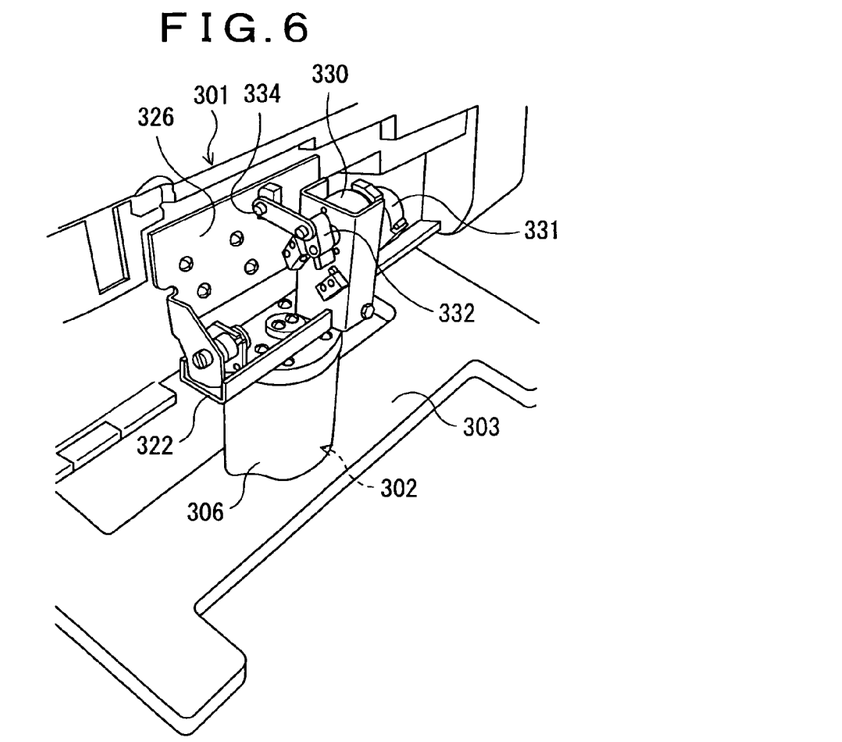
FIG. 6 is a rear perspective view where an electric rotating mechanism for a conventional display is applied for a liquid crystal television.
Figures 7A, 7B:
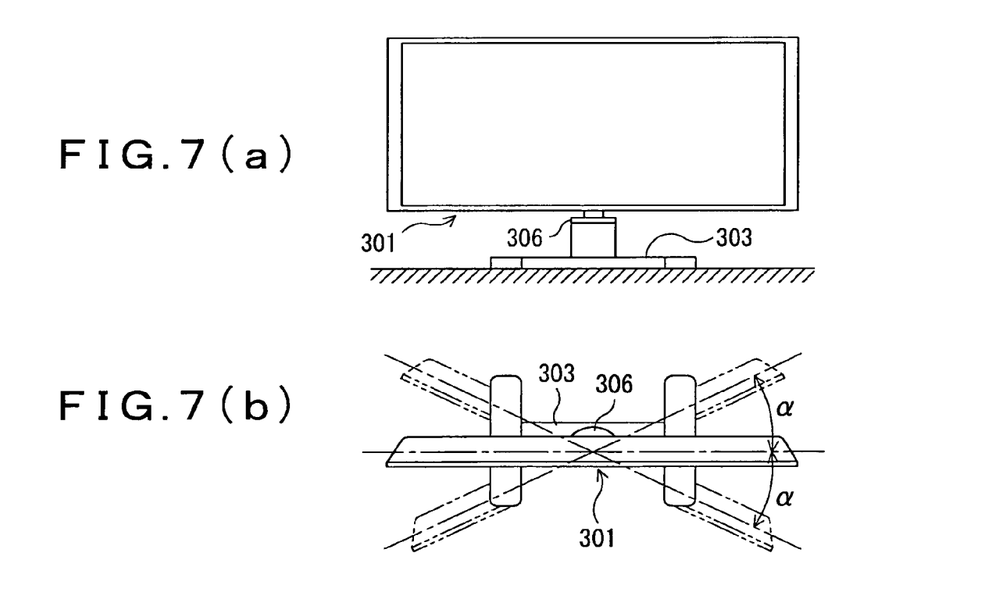
FIG. 7A is a front view thereof.
FIG. 7B is a top view thereof.
Figure 8A:
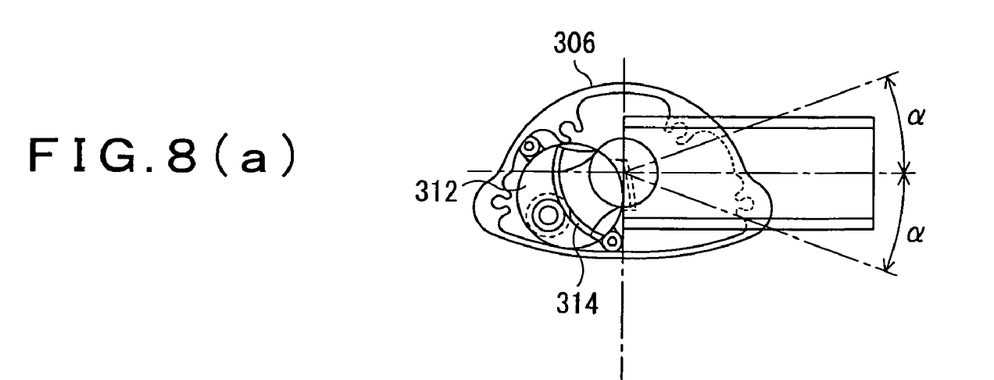
FIG. 8A is a horizontal sectional view thereof.
Figure 8B:
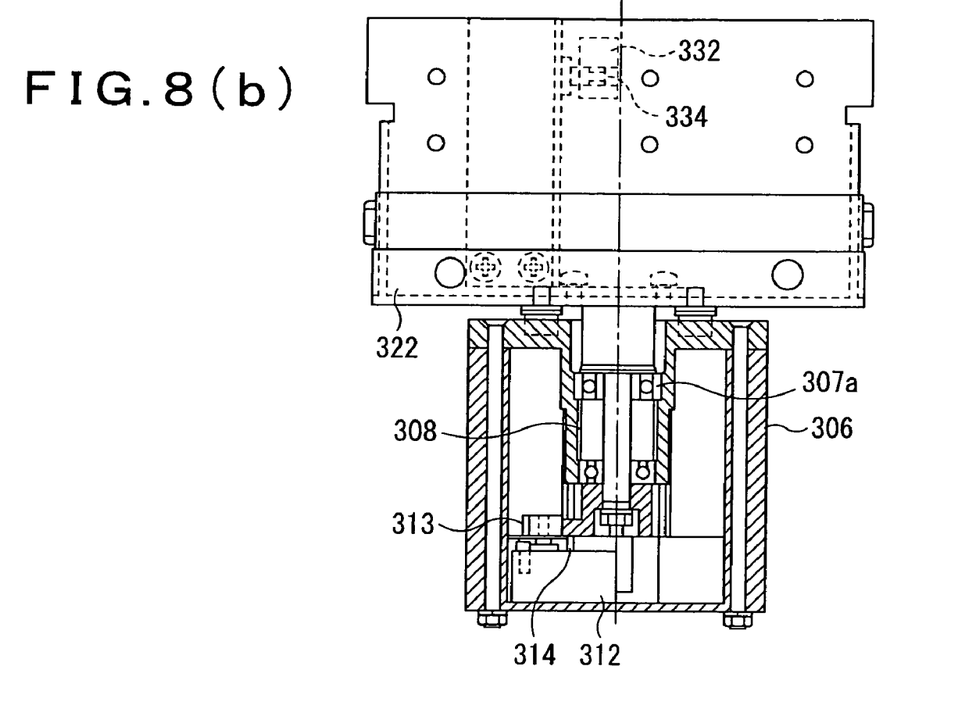
FIG. 8B is a longitudinal sectional view thereof.

The second prior art is shown in FIGS. 5A, 5B and 5C. In the conventional image display device unit provided with a rotating base, as shown in FIGS. 5A, 5B and 5C, a rotating base 201 is formed in such a manner that a rotating piece 203 is provided freely rotatably on a fixed base 202, the rotating piece 203 is driven by a motor M, the motor M is connected to controlling means and its rotation drive is controlled. On either one of the fixed base 202 or the rotating piece 203, a section to be detected is provided corresponding to a position at which the unit is stopped, sensor means for detecting the section to be detected is provided on the other one, and a length from the central portion to the end portion of the section to be detected along the rotating direction of the rotating piece 203 is formed into a length L equivalent to the inertial rotation quantity of the rotating piece 203. The sensor means, when it detects the end portion of the section to be detected in rotating the rotating piece 203, sends a signal that urges the controlling means to stop the rotation of the motor M (refer to Japanese Patent Laid-Open No. 2005-101907, for example).

However, in this constitution, there has been a problem of possibility that, in rotating a television image receiver (not shown) mounted on the rotating piece 203, the television image receiver was damaged when a corner portion of the television image receiver touched an obstacle.

The third prior art is shown in FIG. 6, FIGS. 7A and 7B and FIGS. 8A and 8B. The conventional rotating mechanism for a display, in a constitution where a display 301 is ornamented on a stand pole 306 provided upright and fixed to a pedestal 303 as shown in FIG. 6, FIGS. 7A and 7B, FIGS. 8A and 8B, a rotating shaft 308 supporting the display 301 is freely rotatably supported by bearings 307a in the stand pole 306 and by constituting a horizontal rotating mechanism 302 where a pinion 313 combined to the drive shaft of an electric motor 312 is geared with a major diameter gear 314 combined to the rotating shaft 308, the display 301 was made rotatable in horizontal directions. Further, by connecting an electric motor 331 to a decelerator 330 firmly provided for a support frame 322, and freely rotatably combining a rotating arm 332 combined to the drive shaft of the decelerator and a connecting arm 333 freely rotatably combined to a support plate 326 with a shaft 334, the display 301 was made movable in a tilt direction (refer to Japanese Patent Laid-Open No. 2004-304679, for example).

However, in this constitution, there has been a problem of possibility that the display was damaged when a corner portion of the display 301 rotated by the rotating shaft 308 touched the obstacle.

Figure 9:
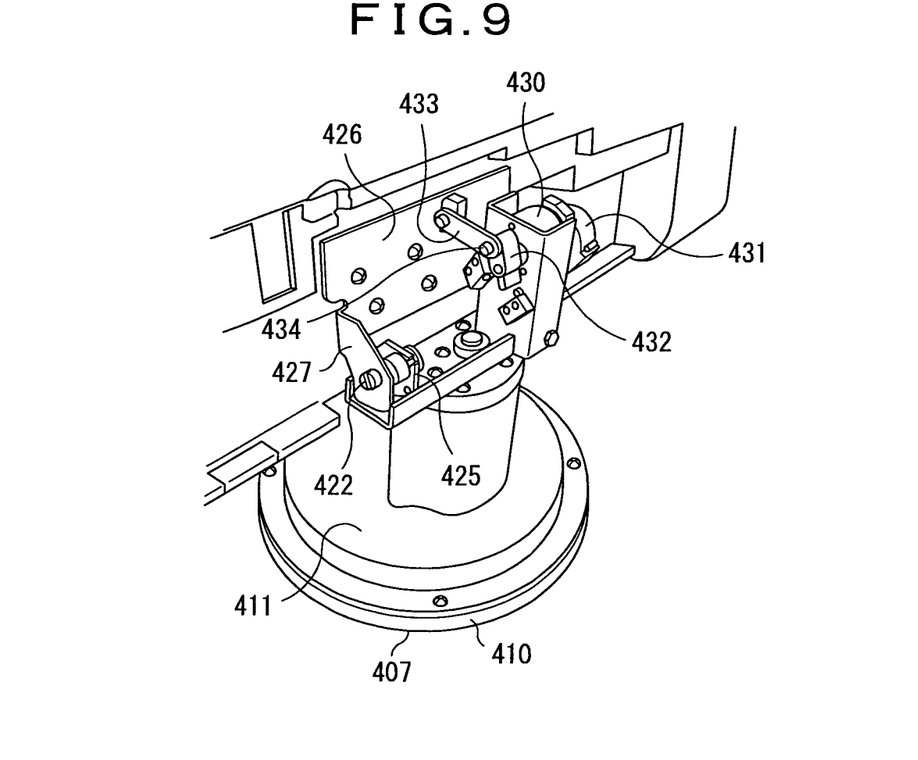
FIG. 9 is a rear perspective view showing an electric rotating mechanism for a display of another conventional example.
Figure 10:
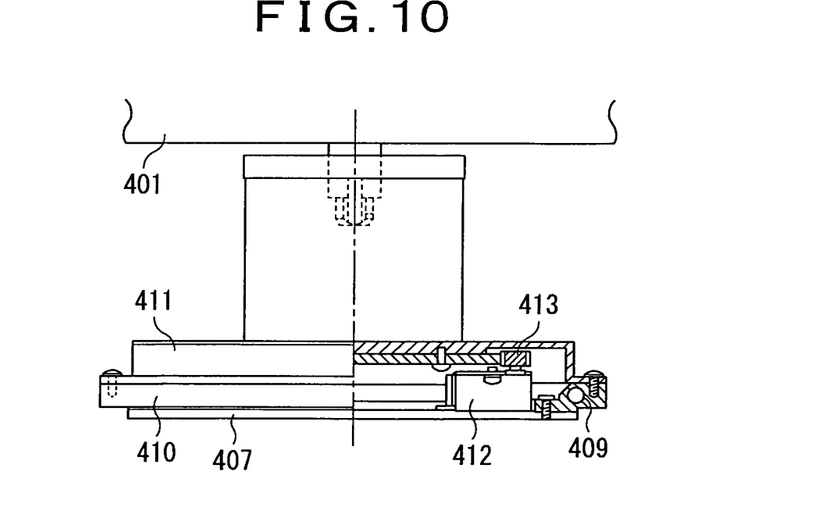
FIG. 10 is a perspective view of the same mechanism.
Figure 11:
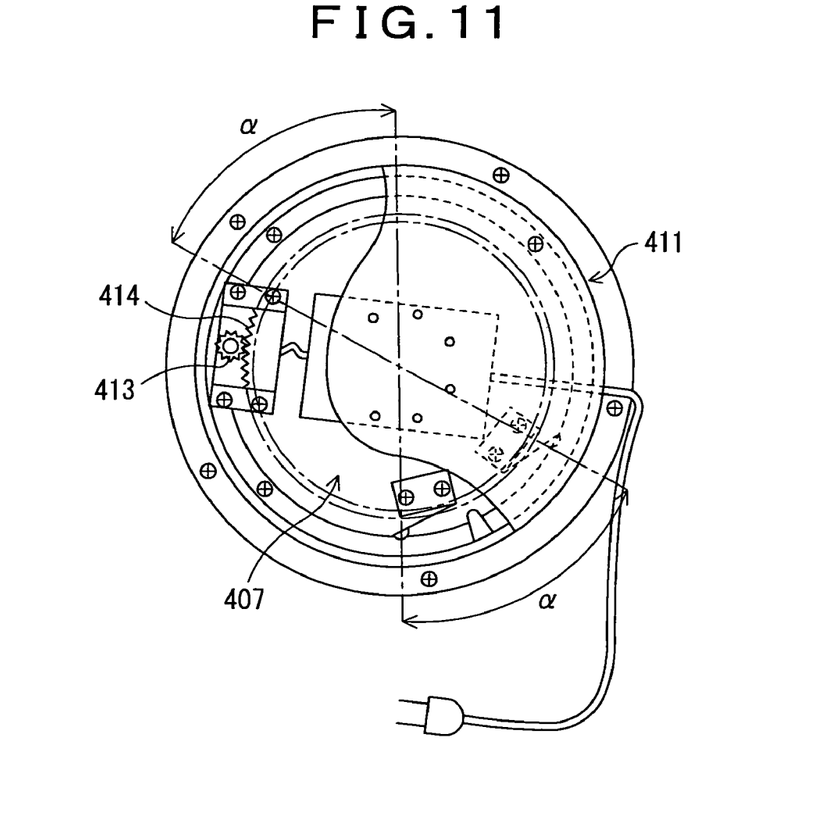
FIG. 11 is a top view of the same mechanism a part of which is cutout.

The fourth prior art is shown in FIG. 9, FIG. 10 and FIG. 11. The conventional electric rotating mechanism for a display, as shown in FIG. 9, FIG. 10, FIG. 11, has a circumferential frame 410 freely rotatably fitted with the circumference of a circular pedestal 407 via a large number of steel balls 409 and a rotating base 411 fixed on the upper portion of the circumferential frame, in which the rotating base 411 is made rotatable in horizontal directions by a constitution where a major diameter gear 414 built in the rotating base is geared with a minor diameter gear 413 of the output shaft of an electric motor 412, a support arm 427 of a support plate 426 fixed on the back surface of the display 401 is supported freely rotatably to a bearing 425 firmly provided for a support frame 422, an electric motor 431 is connected to a decelerator 430 firmly provided for the support frame, and a rotating arm 432 combined to the output shaft of the decelerator is freely rotatably combined with a connecting arm 433 freely turnably combined to the support plate 326 by a shaft 434, and thus, the display 401 was made movable in a tilt direction (refer to Japanese Patent Laid-Open No. 2004-258055, for example).

However, in this constitution, there has been a problem of possibility that in rotating the display 401 in horizontal directions, the display 401 was damaged when a corner portion touched the obstacle.

Figure 12:
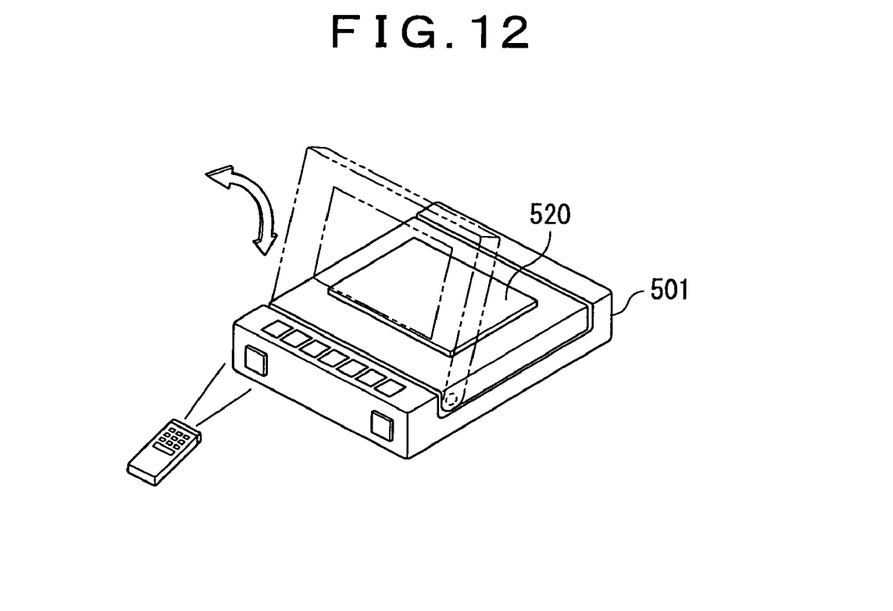
FIG. 12 is a perspective view showing a conventional liquid crystal television image receiver.
Figure 13:
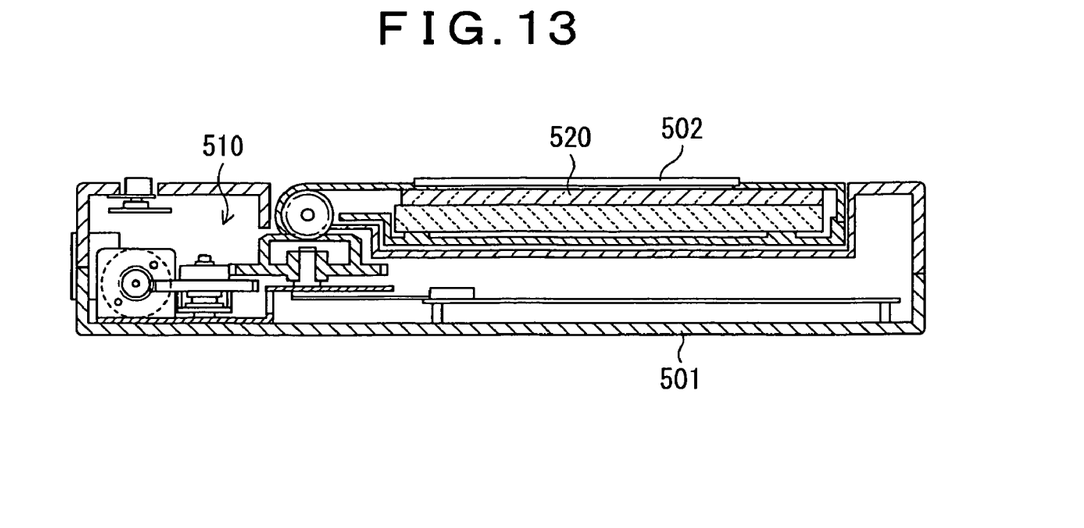
FIG. 13 is a sectional side view of the same image receiver.
Figure 14:
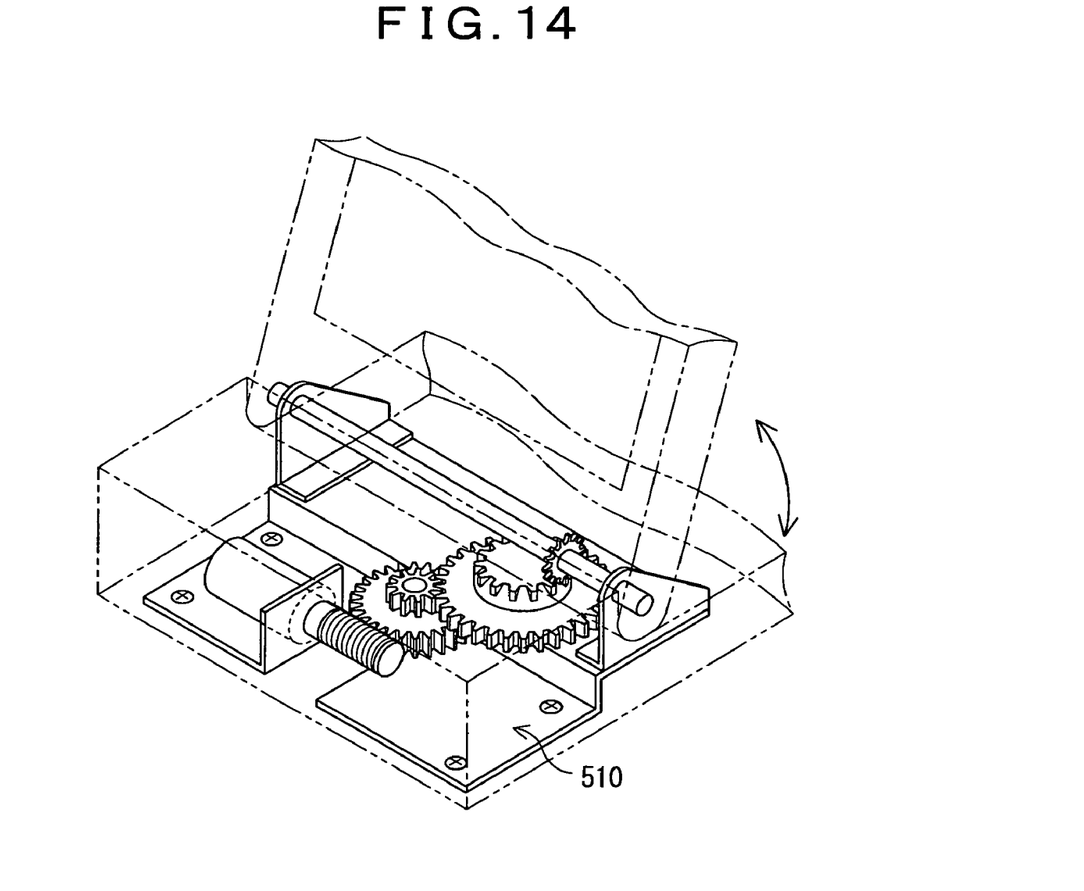
FIG. 14 is a perspective view showing the internal structure of the same image receiver.

The fifth prior art is shown in FIG. 12, FIG. 13 and FIG. 14. As shown in FIG. 12, FIG. 13 and FIG. 14, the conventional liquid crystal television receiver comprises: a liquid crystal television image receiver main body 501; a display section 502 that is freely turnably attached to the main body 501 and equipped with a liquid crystal panel 520; a drive section 510 drive to rotate the display section 502; and a remote controller 504 controlling the drive section 510, in which the drive section 510 includes a drive motor and decelerating means, the rotation of the drive motor is transmitted to the display section 502 via the decelerating means, and the decelerating means includes a slipping mechanism (refer to Japanese Patent Laid-Open No. H2-165785, for example).

However, in this constitution, there has been a problem of possibility that the main body 501 was damaged when the liquid crystal television image receiver main body 501 touched the obstacle.

SUMMARY OF THE INVENTION

The present invention has been created in view of the above-described conventional problems, and it is an object of the invention to provide a thin-shaped television where interference with an obstacle can be suppressed to the minimum and damage of the television main body and the obstacle can be prevented when the television main body is turned in horizontal directions.

The present invention has been suggested to solve the problems described above, and the invention according to Claim 1 is a thin-shaped television that is freely turnably supported on a fixed base in horizontal directions by the drive of a motor and equipped with a television main body having a display section on a front face, which is characterized in that operating bars are provided for corner portions on both sides of the television main body in a longitudinal direction, bosses having a collar portion inside thereof are formed in a protruded manner from the operating bar toward hole portions formed in the corner portions of the television main body on both sides, a plate-shaped portion bridging the corner portions is provided on the back side of the hole portion of the television main body, a spring that energizes the boss toward the outside is arranged between the plate-shaped portion and the collar portion of the boss, a sensor is provided for at least one area in vertical directions of the operating bar, the sensor is constituted by contact terminals provided on the both sides of the boss of the operating bar, contact terminals provided for the pore wall of the hole portion of the television main body so as to face the contact terminals, a contact terminal provided at the tip of the boss, and a contact terminal provided for the plate-shaped portion so as to face the contact terminal, a gap is provided between each contact terminal, in which when the operating bar touches an obstacle in rotating the television main body in horizontal directions, the operating bar activates and any one of the contact terminals facing to each other touches the obstacle, and the drive of the motor turning the television main body is stopped.

The invention is a thin-shaped television that is freely turnably supported on a fixed base in horizontal directions by the drive of a motor and equipped with a television main body having a display section on a front face, which is characterized in that sensors for detecting touching of an obstacle are provided on corner portions on both sides of the television main body when the corner portions on both sides touch the obstacle in the case where the television main body rotates in horizontal directions, and the drive of the motor rotating the television main body is stopped by the detection with the sensors.

The sensor is made up of an approximately L-shaped inside contact terminal and an approximately L-shaped outside contact terminal, which are provided for the corner portions on both sides of the television main body, a flexible cover is attached to the outside of the outside contact terminal, in which the flexible cover on the corner portions on both sides of the television main body curves inside when the television main body touches the obstacle in rotating the body in horizontal directions, the outside contact terminal curves inside to touch the inside contact terminal, and the drive of the motor rotating the television main body is stopped.

BRIEF DESCRIPTION OF THE DRAWINGS

FIG. 2 is a touching state to an obstacle, which is caused by the turning of the thin-shaped television in horizontal directions shown in FIG. 1, where

FIG. 4 shows a conventional television set, where

FIG. 5 shows an image display device unit provided with a rotating base.

FIG. 7 shows the same mechanism, where

FIG. 8 shows the same mechanism, where

PREFERRED EMBODIMENTS OF THE INVENTION

Hereinafter, description will be made for an embodiment of the thin-shaped television according to the present invention referring to the drawings.

Figure 1:
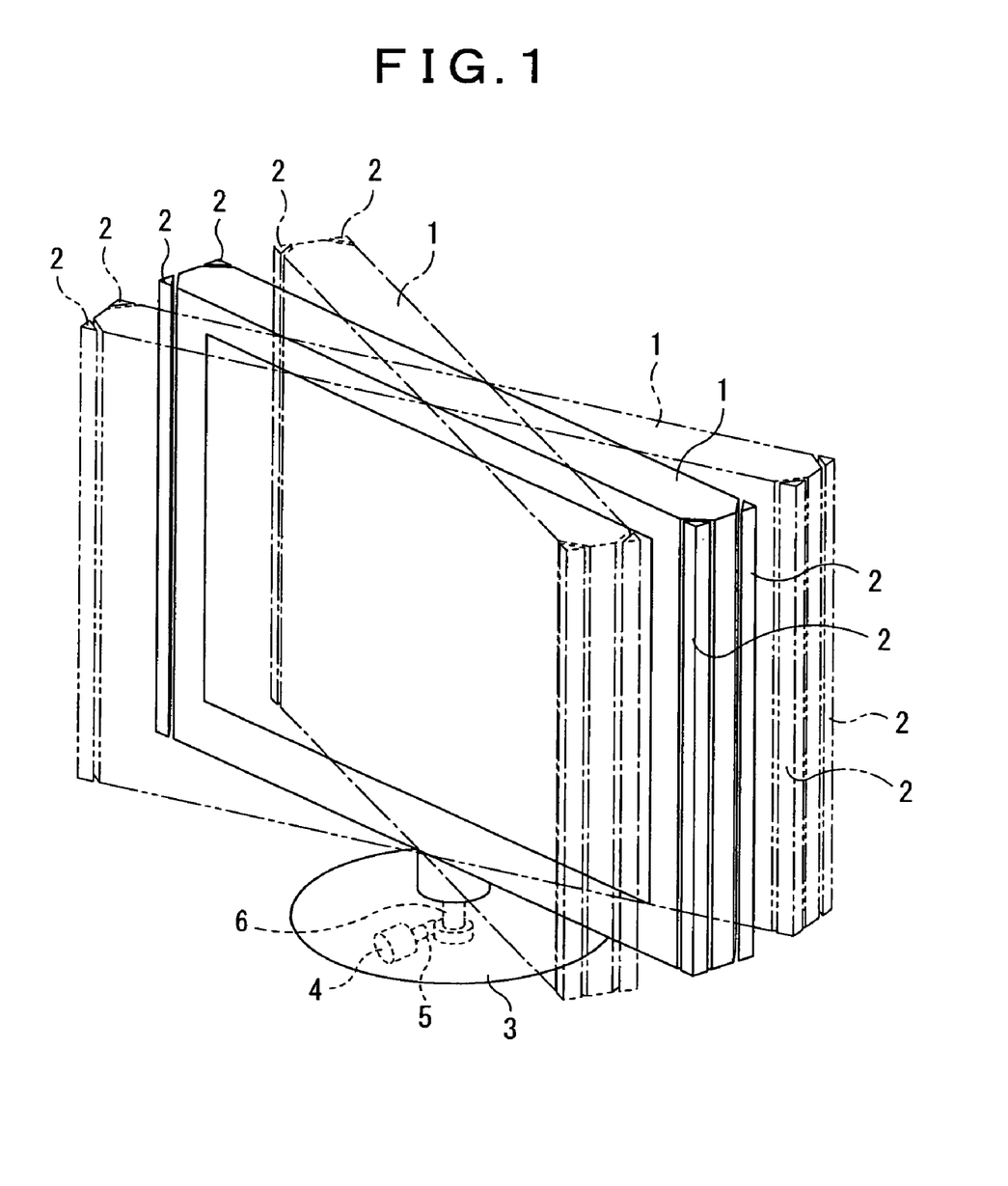
FIG. 1 is a perspective view showing a turning state of a television main body in horizontal directions, which shows an embodiment of a thin-shaped television of the present invention.
Figure 2A:
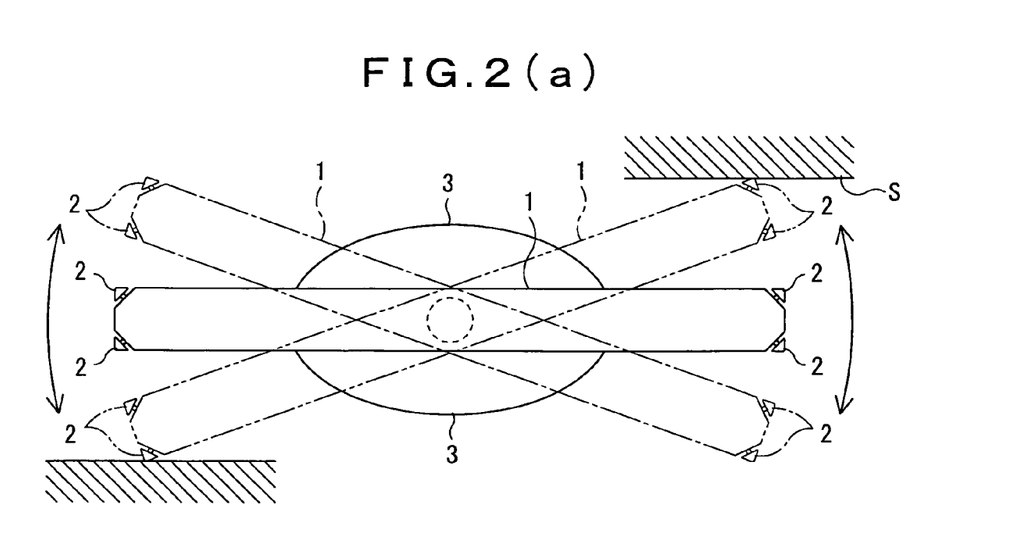
FIG. 2A is a top view thereof.
Figure 2B:
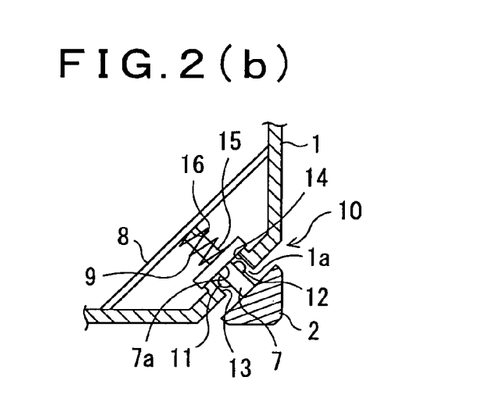
FIG. 2B is a transverse sectional view of a sensor area being a principal portion thereof.
Figure 2C:
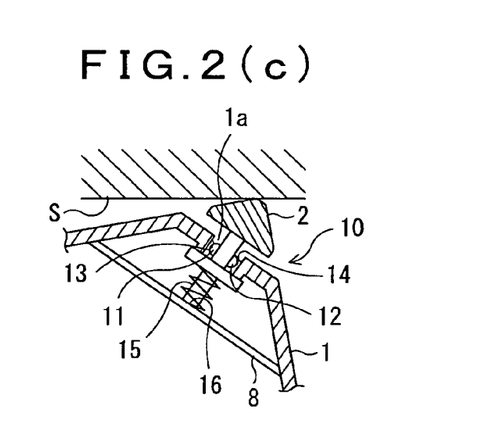
FIG. 2C is a transverse sectional view showing an operating state of the sensor when a corner portion of the television main body touches an obstacle by the sensor.

FIG. 1 is the perspective view showing the turning state of the television main body in horizontal directions, which shows an embodiment of the thin-shaped television of the present invention, FIG. 2 shows a touching state to the obstacle by the turning of the thin-shaped television in horizontal directions shown in FIG. 1, where FIG. 2A is the top view thereof, FIG. 2B is the transverse sectional view of a sensor area being a principal portion, FIG. 2C is transverse sectional view showing an operating state of the sensor when a corner portion of the television main body touches the obstacle by the sensor.

It is assumed that the thin-shaped television of this embodiment, as shown in FIG. 1, be a shape where four corner portions of the television main body 1 were cut, and operating bars 2 are arranged to the four corner portions in an operable manner and in a longitudinal direction. The television main body 1 is designed to be turned in horizontal directions by the drive of a motor 4 via the motor 4, a gear group 5 and a rotating shaft 6 on the fixed base 3. Further, as shown in FIG. 2A, any operating bar 2 of the four corner portions of the television main body 1 is designed to touch the surface of an obstacle S in turning the television main body 1 in horizontal directions. Furthermore, as shown in FIG. 2B, from the operating bar 2 toward a hole portion 1a formed in the corner portions of the television main body 1, a boss 7 having a collar portion 7a on the inside thereof is formed in a protruded manner. Further, a plate-shaped portion 8 bridging the corner portions is provided on the back side of the hole portion 1a of the television main body 1, a spring 9 that energizes the boss 7 to the outside is arranged between the plate-shaped portion 8 and the collar portion 7a of the boss 7. A sensor 10 is provided for the operating bar 2 in at least one area in vertical directions. The sensor 10 is constituted by contact terminals 11 and 12 provided on the both sides of the boss 7 of the operating bar 2, contact terminals 13 and 14 provided for the pore wall of the hole portion 1a of the television main body 1 so as to face the contact terminals 11 and 12, a contact terminal 15 provided at the tip of the boss 7, and a contact terminal 16 provided for the plate-shaped portion 8 so as to face the contact terminal 15. Further, a gap is provided between each of facing contact terminals 11, 12, 13, 14, 15 and 16.

When the operating bar 2 touches the obstacle S, while television main body 1 is rotated by the drive of the motor 4, once the operating bar 2 is activated after being pushed by the obstacle S as shown in FIG. 2C, the contact terminal 11 on the boss 7 side touches the contact terminal 13 on the hole portion 1a side of the television main body 1, the drive of the motor 4 stops, and the rotation of television main body 1 stops. Further, depending on a movement of the operating bar 2, touching between the contact terminal 12 on the other side of the boss and the contact terminal 14 on the other side of the hole portion of the television main body 1 could occur, or the contact terminal 15 at the tip of the boss 7 could touch the contact terminal 16 of the plate-shaped portion 8.

Therefore, according to this embodiment, by the operation of the operating bar 2, the contact terminal 11, 12, or 14 constituting the sensor 10 touches a facing contact terminal 13, 14, or 15 to stop the drive of the motor 4, so that the turning of the television main body 1 in horizontal directions is stopped. Consequently, by stopping the turning of the television main body 1 in horizontal directions, interference between the television main body 1 and the obstacle S can be suppressed to the minimum, and damage of the television main body 1 and the obstacle S can be prevented.

Figure 3A:
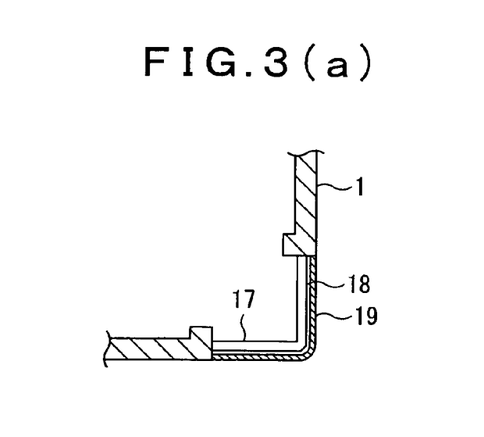
FIG. 3 is a transverse sectional view showing the structure of a sensor of another example.

FIG. 3 is the transverse sectional view showing the structure of the sensor in another example.

In the sensor of the another example, as shown in FIG. 3, an approximately L-shaped inside contact terminal 17 and an approximately L-shaped outside contact terminal 18 are provided at corner portions on both sides of the television main body 1, and an approximately L-shaped flexible cover 19 made of rubber, resin or the like is attached outside the outside contact terminal 18. When the flexible cover 19 touches the obstacle S in rotating the television main body 1 in horizontal directions, the flexible cover 19 curves to allow the outside contact terminal 18 to curve as well, and the outside contact terminal 18 touches the inside contact terminal 17. The touching causes the motor 4 rotating the television main body 1 to stop and the television main body 1 stops further rotation. Therefore, by stopping the turning of the television main body 1 in horizontal directions, interference between the television main body 1 and the obstacle S can be suppressed to the minimum, and damage of the television main body 1 and the obstacle S can be prevented. Further, due to the constitution only by the flexible cover 19, the outside contact terminal 18 and the inside contact terminal 17, a structure can be simplified. Furthermore, since the outside contact terminal 18 is protected by the flexible cover 19, its damaging can be prevented.

Meanwhile, it goes with out saying that the sensor is not limited to the above-described contact terminal, but an optical sensor or the like positioned at the corner portions on both sides of the television main body 1 can be also applied.

According to the invention of Claim 1, when the corner portion of the television main body turned in horizontal directions by the drive of the motor touches the obstacle, the operating bar provided for the corner portion is activated laterally by the touching to the obstacle. By the operation of the operating bar, the contact terminal constituting the sensor touches a facing contact terminal to stop the drive of the motor, so that the turning of the television main body in horizontal directions is stopped. Therefore, by stopping the turning of the television main body in horizontal directions, interference between the television main body and the obstacle can be suppressed to the minimum, and damage of the television main body and the obstacle can be prevented.

According to the invention, when the corner portion of the television main body turned in horizontal directions by the drive of the motor is about to touch the obstacle, the sensor detects the touching and the drive of the motor is stopped. Therefore, by stopping the turning of the television main body in horizontal directions, interference between the television main body and the obstacle can be suppressed to the minimum, and damage of the television main body and the obstacle can be prevented.

According to the invention, when the corner portion of the television main body turned in horizontal directions by the drive of the motor touches the obstacle, the flexible cover curves to allow the outside contact terminal to curve and touch the inside contact terminal. Therefore, the drive of the motor is stopped by the touching of the outside contact terminal and the inside contact terminal. Consequently, by stopping the turning of the television main body in horizontal directions, interference between the television main body and the obstacle can be suppressed to the minimum, and damage of the television main body and the obstacle can be prevented. Further, due to the constitution only by the flexible cover, the outside contact terminal and the inside contact terminal, the structure can be simplified. Furthermore, since the outside contact terminal is protected by the flexible cover, its damaging can be prevented.

What is claimed is:

1. A thin-shaped television that is freely turnably supported on a fixed base in horizontal directions by the drive of a motor and equipped with a television main body having a display section on a front face, wherein
    operating bars on corner portions of the corners of said television main body in a longitudinal direction, the corner portions have holes formed therein;
    bosses having a collar portion extend from the operating bar into the holes of said corner portions of the television main body;
    a plate-shaped portion bridging each corner portions on the interior of said television main body,
    a spring located between each plate-shaped portion and the corresponding collar portion of said boss, forcing the boss toward the operating bar,
    a sensor for each corner portion is provided for at least one area in vertical directions of said operating bar, in which each sensor includes first and second upper boss contact terminals provided on both sides of said boss, first and second hole portion contact terminals located on both sides of inner wall of said hole portion as to face first and second upper boss contact terminals, a lower boss contact terminal located on a lower portion of said boss, and a plate-shaped portion contact terminal located on said plate-shaped portion so as to face outward toward the hole portion, and
    a gap between each of said contact terminal sets, in which when said operating bar touches an obstacle in rotating said television main body in horizontal directions, said operating bar activates said sensor and a stopping means causes the drive of said motor turning said television main body to stop.

* * * * *